H. P. SUHL.
DRIVE ATTACHMENT.
APPLICATION FILED MAR. 12, 1918.
1,288,271.
Patented Dec. 17, 1918.
3 SHEETS—SHEET 1.
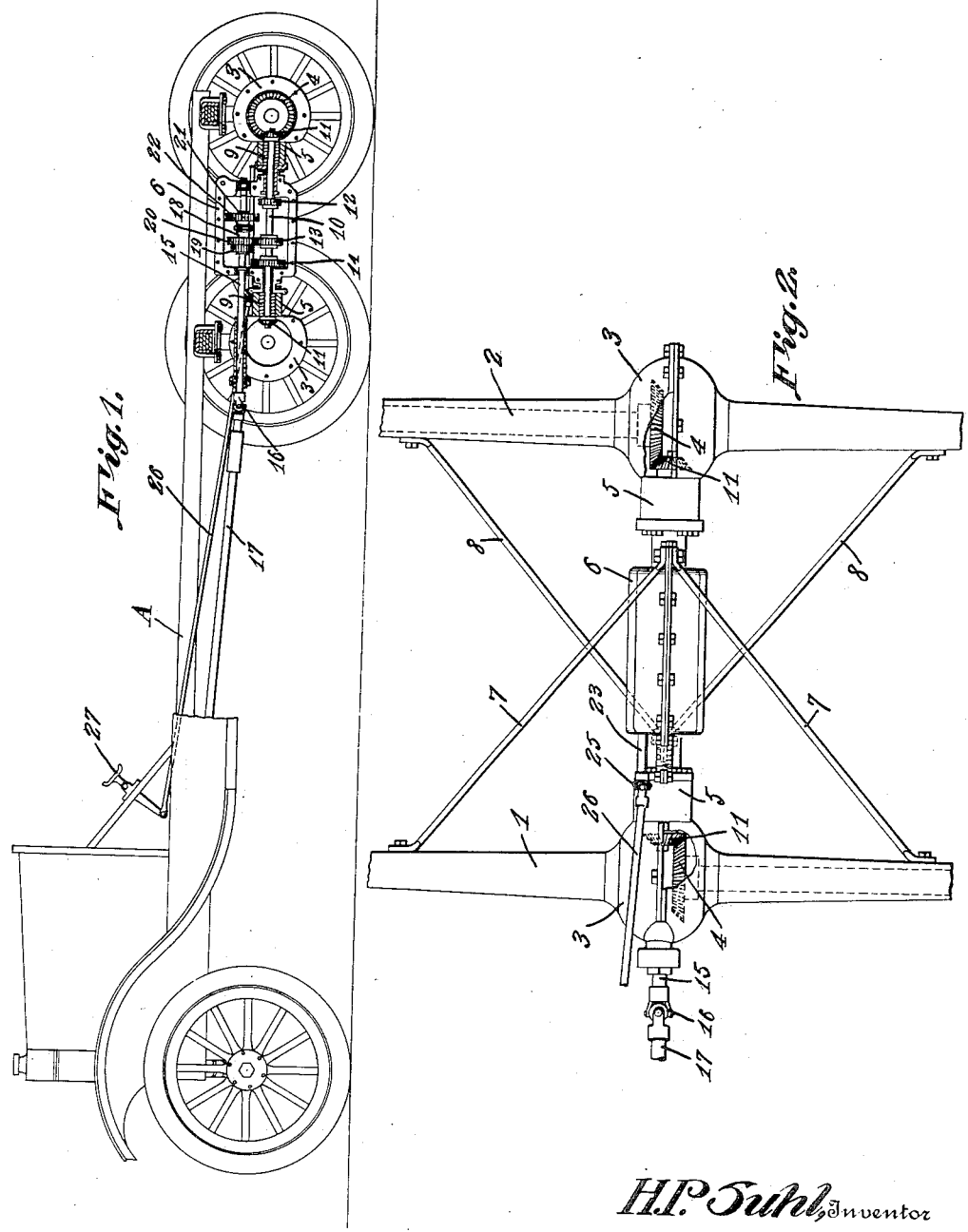

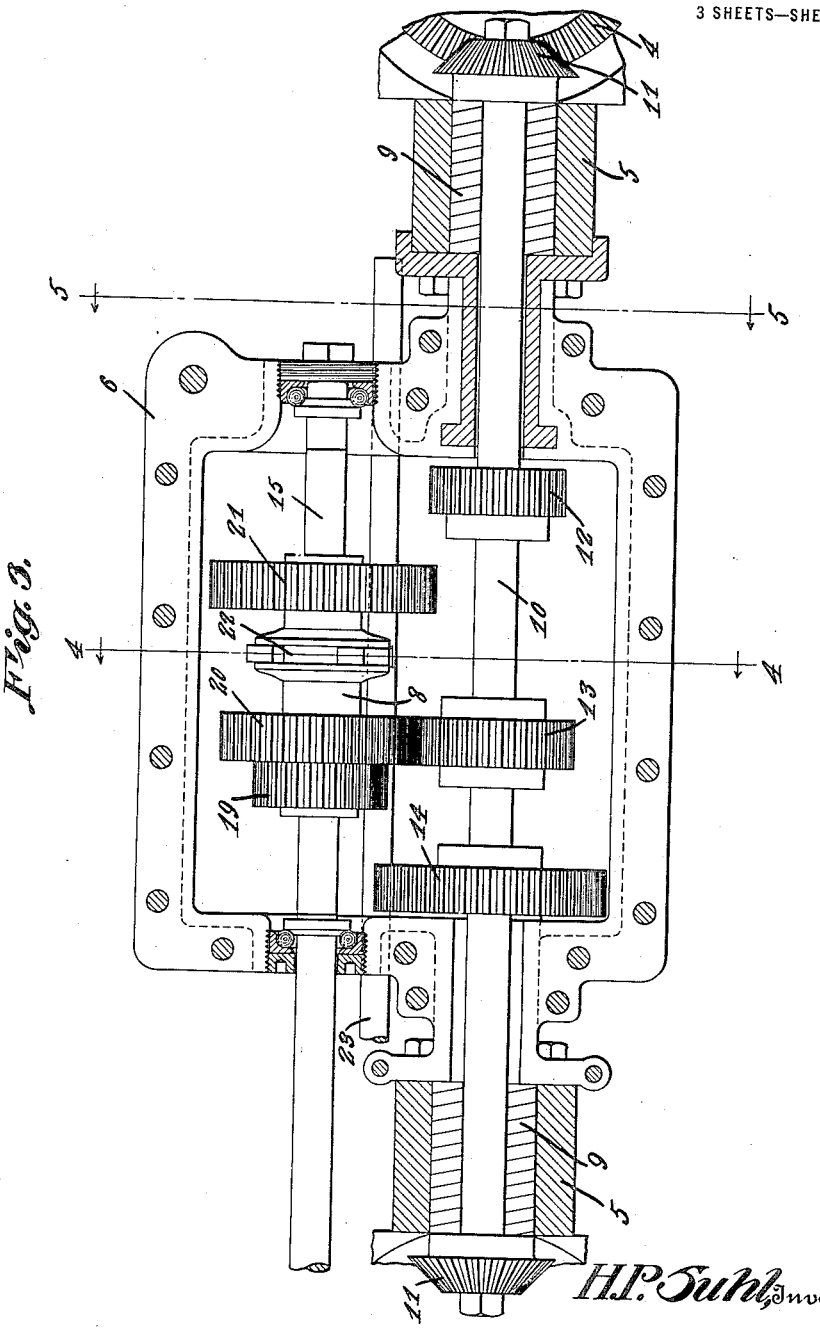

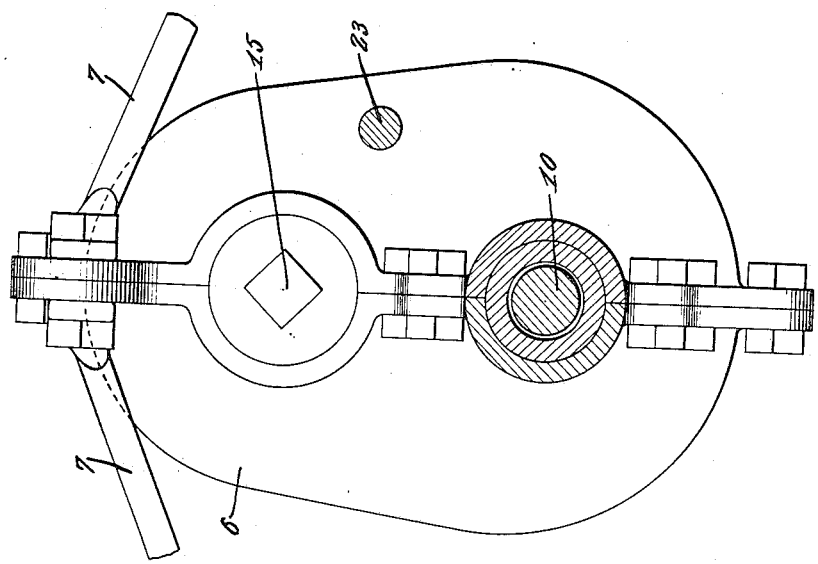
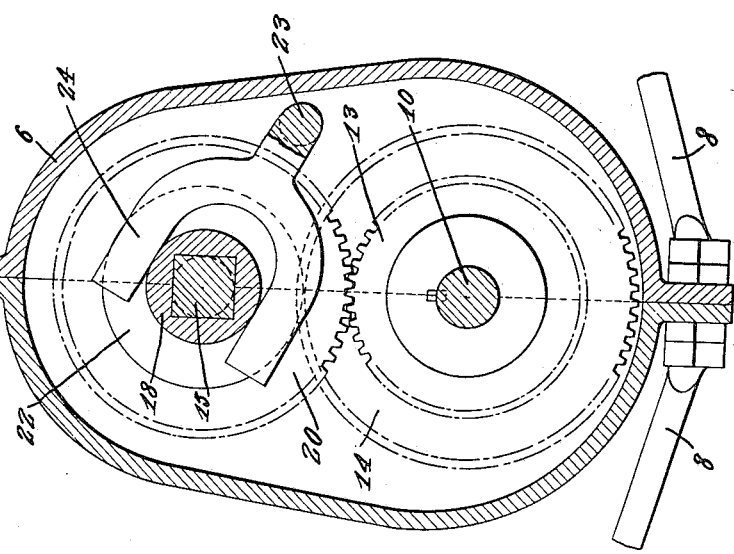

UNITED STATES PATENT OFFICE.

HERBERT P. SUHL, OF KISSIMMEE, FLORIDA.

DRIVE ATTACHMENT.

1,288,271.  Specification of Letters Patent.  Patented Dec. 17, 1918.

Application filed March 12, 1918. Serial No. 221,982.

*To all whom it may concern:*

Be it known that I, HERBERT P. SUHL, a citizen of the United States, residing at Kissimmee, in the county of Osceola and State of Florida, have invented a new and useful Drive Attachment, of which the following is a specification.

This invention relates to a drive attachment for automobiles, one of its objects being to provide means whereby a four wheel vehicle having two drive wheels can be converted into a six wheel vehicle having four drive wheels, the four drive wheels being arranged close together thus to perform the duty of two drive wheels, produce a vehicle which will ride easier than one with but two drive wheels, and increase the ground friction and carrying capacity.

A further object is to provide an attachment of this character which can be applied readily and which is strong and durable, it being especially designed for use upon the well known Ford automobile, although it can also be employed in connection with machines of other makes.

With the foregoing and other objects in view which will appear as the description proceeds, the invention consists of certain novel details of construction and combinations of parts which will be hereinafter more fully described and pointed out in the claim, it being understood that various changes may be made in the arrangement and proportions of parts within the scope of the claim without departing from the spirit or sacrificing any of the advantages of the invention.

In the accompanying drawings the preferred form of the invention has been shown.

In said drawings

Figure 1 is a view partly in side elevation and partly in section of a motor vehicle having the present improvements applied thereto.

Fig. 2 is a plan view of the attachment, the ground engaging wheels and the ends of the axles being removed.

Fig. 3 is a central vertical section through the gear case of the attachment.

Fig. 4 is a section on line 4—4, Fig. 3.

Fig. 5 is a section on line 5—5, Fig. 3.

Referring to the figures by characters of reference, A designates the chassis of a motor vehicle to the rear portion of which is secured the drive attachment constituting the present invention. This attachment includes parallel axles 1 and 2 each having a differential casing 3. In the drawings the differentials have not been illustrated in full but only one gear 4 of each differential has been shown. Bearing members 5 are extended toward each other from the respective casings 5 and are bolted or otherwise secured to the respective ends of a gear casing 6 which is supported between the axles. The gear casing is preferably formed of connected sections and the various parts are braced by rearwardly converging braces 7 secured at their forward ends to the end portions of the front axle 1 and at their rear ends to the rear portion of the gear case, another pair of braces being attached to the end portions of the rear axle 2 and converging forwardly and attached to the front portion of the gear case. These last named braces, which are shown at 8 are secured to the bottom of the gear case while the braces 7 are secured to the top of the case. This provides a strong and durable connection between the parts.

Extending longitudinally within the case 6 and journaled in bearings 9 in the members 5 is a shaft 10 provided at its ends with gears 11 which mesh with the annular gears of the differentials, as shown. Fixedly secured to the shaft 10 and housed in the case 6 are gears 12, 13 and 14, the distance between the gears 12 and 13 being much greater than the distance between the gears 13 and 14. Another shaft 15 is journaled in the top portion of the case 6 and extends forwardly through the front differential casing 3 and is connected by a universal joint 16, to the transmission shaft 17 of the vehicle. That portion of the shaft 15 within the gear case is preferably angular in cross section and slidably mounted on it is a sleeve 18 having gears 19, 20 and 21 secured thereto. A grooved flange or collar 22 is formed on the sleeve and is engaged by a forked arm formed at one end of a sliding rod 23, as shown at 24. The rod extends forwardly from the gear case and is connected by a universal joint 25 to an operating rod 26 which can be connected to a foot lever 27 or the like.

The gears 12, 13 and 14 are of different diameters and the gears 19, 20 and 21 are also of different diameters, as shown. As the shaft 15 is the drive shaft it will be apparent that by shifting the gears 19, 20 and 21 so as to bring them into mesh with their respective gears on the shaft 10 the speed of the vehicle can be controlled. In every instance motion is transmitted to the shaft 10 and, through the gears 11 to the two differentials so that both pairs of drive wheels will be uniformly driven and the ground friction of the vehicle will be greatly increased with a correspondingly increased carrying capacity.

Importance is attached to the means employed for connecting the two axles of the attachment for the reason that the two axles of the attachment are thus held against all relative movement except vertically.

What is claimed is:—

A four wheel drive attachment for motor vehicles including parallel axles each containing drive mechanism including a differential, a gear case interposed between and supported by the axles, a pair of braces connected to each axle, the braces of one pair being connected to and converging toward the top of the gear case at the remote end thereof and the braces of the other pair converging toward and being secured to the bottom of the gear case at the remote end thereof, a shaft and gear connection between the differentials and journaled within the gear case, a drive shaft journaled in said case, and change speed mechanism for transmitting motion from the drive shaft to the said connection.

In testimony that I claim the foregoing as my own, I have hereto affixed my signature in the presence of two witnesses.

HERBERT P. SUHL.

Witnesses:
ROGER DODD,
BESS F. MOSELEY.